US012131619B2

(12) United States Patent
Else et al.

(10) Patent No.: US 12,131,619 B2
(45) Date of Patent: Oct. 29, 2024

(54) EMBEDDED FINGERPRINT SENSOR FOR A PREMISES SECURITY SYSTEM

(71) Applicant: The ADT Security Corporation, Boca Raton, FL (US)

(72) Inventors: Steven Else, Deerfield Beach, FL (US); Jatin Patel, Boca Raton, FL (US)

(73) Assignee: The ADT Security Corporation, Boca Raton, FL (US)

( * ) Notice: Subject to any disclaimer, the term of this patent is extended or adjusted under 35 U.S.C. 154(b) by 114 days.

(21) Appl. No.: 18/065,000

(22) Filed: Dec. 13, 2022

(65) Prior Publication Data

US 2024/0194050 A1 Jun. 13, 2024

(51) Int. Cl.
*G08B 25/00* (2006.01)
*G06V 40/12* (2022.01)
*G06V 40/13* (2022.01)

(52) U.S. Cl.
CPC ....... *G08B 25/008* (2013.01); *G06V 40/1306* (2022.01); *G06V 40/1365* (2022.01); *G06V 40/1382* (2022.01)

(58) Field of Classification Search
None
See application file for complete search history.

(56) References Cited

U.S. PATENT DOCUMENTS

| | | | |
|---|---|---|---|
| 5,515,738 A * | 5/1996 | Tamori | G01L 1/16 73/862.626 |
| 5,647,364 A * | 7/1997 | Schneider | A61B 5/1172 600/445 |
| 6,812,621 B2 * | 11/2004 | Scott | G06V 40/10 310/334 |
| D591,186 S | 4/2009 | Haley et al. | |
| 7,908,896 B1 * | 3/2011 | Olson | G07C 9/00563 70/432 |
| 8,508,103 B2 * | 8/2013 | Schmitt | B06B 1/0629 310/317 |
| 10,068,077 B2 | 9/2018 | Mucci et al. | |
| 10,198,610 B1 * | 2/2019 | Yousefpor | B06B 1/0622 |
| 10,325,136 B1 * | 6/2019 | Yeke Yazdandoost | H04M 1/67 |
| 10,354,517 B1 | 7/2019 | King | |
| 10,430,631 B2 * | 10/2019 | Lu | G06V 40/1306 |
| 10,691,912 B2 | 6/2020 | Khuri-Yakub et al. | |
| 10,721,257 B2 | 7/2020 | Poder et al. | |

(Continued)

*Primary Examiner* — K. Wong
(74) *Attorney, Agent, or Firm* — Weisberg I.P. Law, P.A.

(57) ABSTRACT

A system is provided. The system includes a premises sensor configured to detect a premises condition, a premises security control device configured to obtain data from the premises sensor representing the premises condition, the premises security control device is further configured to communicate with a remote monitoring center, a user interface device is configured to communicate with the premises monitoring control device. The user interface device includes a plastic housing, a liquid crystal display (LCD) removably secured to the plastic housing, a fingerprint sensor mounted in a fixed position relative to the plastic housing and the LCD, and processing circuitry configured to: receive fingerprint data from the fingerprint sensor, determine that the fingerprint data meets an authentication criterion, and in response to determining that the fingerprint data meets the authentication criterion, trigger a premises security system action.

16 Claims, 4 Drawing Sheets

(56) References Cited

U.S. PATENT DOCUMENTS

| | | |
|---|---|---|
| 11,048,218 B2 | 6/2021 | Burke et al. |
| 11,950,512 B2 * | 4/2024 | Khajeh ................. B06B 1/0629 |
| 2008/0258580 A1 * | 10/2008 | Schneider .......... G06V 40/1306 |
| | | 310/334 |
| 2013/0173925 A1 | 7/2013 | Yen et al. |
| 2020/0382860 A1 | 12/2020 | Wilker et al. |

* cited by examiner

EMBEDDED FINGERPRINT SENSOR FOR A PREMISES SECURITY SYSTEM

TECHNICAL FIELD

The present invention relates to premises security systems, and in particular to fingerprint sensors in premises security systems.

BACKGROUND

Existing premises security systems are configured to monitor a premises for one or more events that trigger one or more premises security system alarms. These premises security systems typically utilize keypads as the main input method for users to arm and disarm their premises security systems. For example, a user may enter a predefined user code that is configured to arm or disarm the premises security system. Unfortunately, users may inadvertently hit the wrong keys or forget their user codes resulting in false alarms or difficulties in accessing a premises. Secondary devices such as key fobs and RFID tags that have been linked to the premises security system may be used to arm or disarm the system. However, these secondary devices are susceptible to being lost or stolen.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
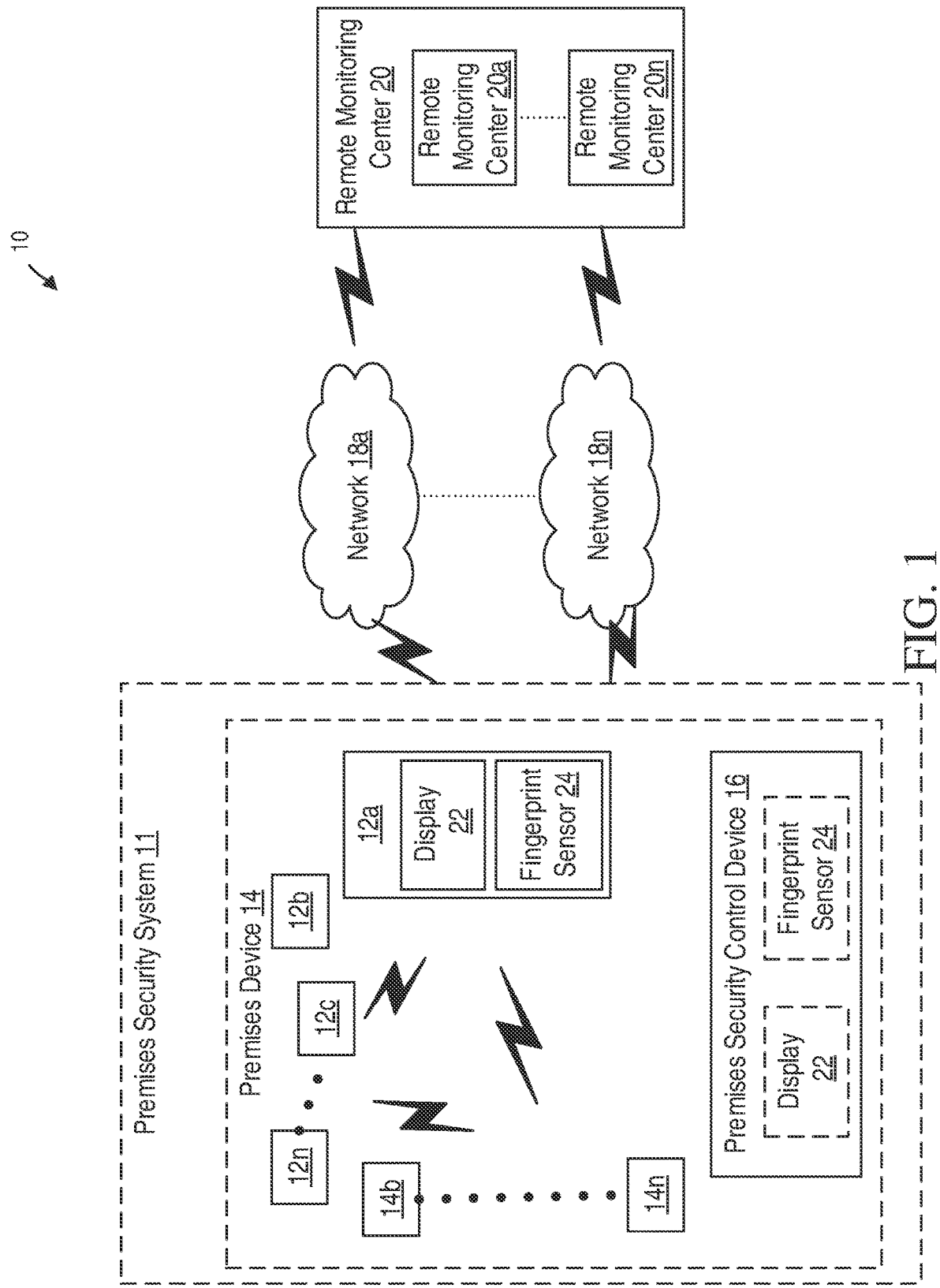
FIG. 1 is a block diagram of an example premises security system in accordance with various embodiments of the present disclosure.

Before describing in detail exemplary embodiments, it is noted that the embodiments may reside in combinations of apparatus components and processing steps related to embedding a fingerprint sensor in a device such as, for example, in a user interface device of a premises security system. In one or more examples described herein, the fingerprint sensor is positioned below the glass layer of a Liquid Crystal Display (LCD) screen or plastic housing of the user interface device. The configuration allows a user's fingerprint to be scanned through the glass or plastic material using ultrasonic waves to generate a three-dimensional (3D) image of the user's unique fingerprint characteristics, such as, for example, sweat pores, ridges and other details, as well as detect blood flow and impedance to avoid spoofing of the fingerprint. Some embodiments further enable a finger swipe over the fingerprint sensor in a particular direction to be linked to a specific user interface (UI) function, thereby supporting alternative forms of navigation of the premises device's menu.

In the drawings, components may be represented where appropriate by conventional symbols, showing only those specific details that may facilitate understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a," "an" and "the" are intended to include the plural forms as well, unless the context clearly indicates otherwise. It will be further understood that the terms "comprises," "comprising," "includes," "including," "has," and "having" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures, in which like reference designators refer to like elements, there is shown in FIG. 1 a system designated generally as "10." System 10 may include premises security system 11 where premises security system 11 includes and/or is associated with one or more user interface devices 12a to 12n (collectively referred to as "user interface device 12"), and one or more premises devices 14a to 14n (collectively referred to as "premises device 14"), and premises security control device 16. System 10 may further include one or more networks 18a to 18n (collectively referred to as "network 18"), and one or more remote monitoring centers 20a to 20n (collectively referred to as "remote monitoring center 20"), communicating with each other or with at least one other entity in system 10.

User interface device 12 may be a device, such as a wired or wireless device, which allows a user to communicate with premises security control device 16. User interface device 12 may be a portable control keypad/interface 12a, computer 12b, mobile phone 12c and tablet 12n, among other devices that allow a user to interact with premises security control device 16 and/or one or more premises devices 14. User interface device 12 may communicate at least with premises security control device 16 using one or more wired and/or wireless communication protocols. For example, portable control keypad 12a may communicate with premises security control device 16 via a ZigBee based communication link, e.g., network based on Institute of Electrical and Electronics Engineers (IEEE) 802.15.4 protocols, and/or Z-wave based communication link, or over the premises' local area network, e.g., network-based on Institute of Electrical and Electronics Engineers (IEEE) 802.11 protocols, user interface device 12.

User interface device 12 may include one or more displays 22, such as a liquid crystal display (LCD) 22, and a fingerprint sensor 24, as described herein. For example, the fingerprint sensor 24 may be embedded in the LCD 22 and configured to scan a user's fingerprint through a glass layer of the LCD 22 as described in more detail herein. The fingerprint sensor 24 may alternatively be positioned within and physically against the plastic housing of the user interface device 12, and configured to scan the user's fingerprint through the plastic housing such as when the user places a finger in physical contact with the outside of the plastic housing. While the fingerprint sensor 24 is described as being positioned within a plastic housing or embedded within LCD 22, the teachings herein are equally applicable to other types of materials other than plastic and to other types of display technology other than LCD. In one or more embodiments, the fingerprint sensor 24 output may be transmitted to premises security control device 16, remote monitoring center 20 or other entity in system 10 for further analysis, e.g., to determine if the fingerprint sensor 24 output matches a prestored fingerprint to authenticate a user.

Premises devices 14 may include one or more types of sensors, control and/or image capture devices for monitoring a premises. For example, a single premises device 14 may include multiple image capture devices (e.g., several digital camera devices pointed at different angles, generating multiple respective video/image/audio streams, contained within a single premises device 14). For example, the types of sensors may include various safety related sensors such as motion sensors, fire sensors, carbon monoxide sensors, flooding sensors and contact sensors, among other sensor types that are known in the art. The premise devices 14 may include, for example, one or more lifestyle (e.g., home automation) related devices configured to adjust at least one premises setting such as lighting, temperature, energy usage, door lock and power settings, among other settings associated with the premises or devices on the premises. Image capture devices may include a digital camera and/or video camera, among other image captures devices that are well known in the art. Premises device 14 may communicate with premises security control device 16 via one or more wireless communication protocols. Various additional sensors and control and/or image capture devices may relate to life safety or lifestyle depending on both what the sensors, control and image capture devices do and how these sensors, control and image devices are used by system 10.

Premises security control device 16 may communicate with network 18 via one or more communication links. In particular, the communications links may be broadband communication links, such as a wired cable modem or Ethernet communication link, and digital cellular communication link, e.g., long term evolution (LTE) and/or 5G based link, among other broadband communication links. Broadband as used herein may refer to a communication link other than a plain old telephone service (POTS) line. Ethernet communication link may be an IEEE 802.3 or 802.11 based communication link.

Network 18 may be a wide area network, local area network, wireless local network and metropolitan area network, among other networks. Network 18 provides communications among one or more of user interface device 12, premises security control device 16 and remote monitoring center 20. In one or more embodiments, the functionality of premises security control device 16 may be included in premises device 14 or user interface device 12. In one or more embodiments, functionality of premises security control device 16 may be included in remote monitoring center 20 or may be network cloud implemented logical devices.

Premises security control device 16 may provide one or more of management functions, control functions such as power management, premises device management and alarm management and/or analysis, authentication management (including fingerprint verification), among other functions to premises security system 11. For example, premises security control device 16 may be configured to receive data from premises devices 14 and user interface devices 12 for performing and/or triggering premises security system 11 actions, such as, for example, arming and/or disarming system 11, triggering an alarm, etc. In particular, premises security control device 16 may manage one or more life safety and lifestyle features. Life safety features may correspond to security system functions and settings associated with premises conditions that may result in life threatening harm to a person such as carbon monoxide detection and intrusion detection. Lifestyle features may correspond to security system functions and settings associated with video capturing devices and non-life-threatening conditions of the premises such as lighting and thermostat functions.

In one or more embodiments, premises security control device 16 may include one or more displays 22 such as LCD 22, as described herein. Further in one or more embodiments, premises security control device 16 may include fingerprint sensor 24. For example, the fingerprint sensor 24 may be embedded in the LCD 22 screen of the premises security control device 16 and configured to scan a user's fingerprint through a glass layer of the LCD 22, such as when the user's finger is in physical contact with the glass layer of the LCD 22, as described in more detail herein. The fingerprint sensor 24 may alternatively be positioned within and physically against the plastic housing of the premises security control device 16 and configured to scan the user's fingerprint through the plastic housing such as when the user places a finger in physical contact with the outside portion of the plastic housing covering the fingerprint sensor 24. Further, the fingerprint sensor 24 output may be analyzed by premises security control device 16 to determine if the fingerprint sensor 24 output matches a stored fingerprint. In another example, the fingerprint sensor 24 may be transmitted to the remote monitoring center 20 and/or other entity in system 10 for further analysis.

While premises security control device 16 is illustrated as being a separate device from user interface device 12 and premises device 14, in one or more embodiments, premises security control device 16 may be integrated with one or more user interface devices 12 and/or other entity or device located at premises associated with premises security system 11.

Non-limiting example implementations, in accordance with one or more embodiments, of premises security control device 16 and user interface device 12 discussed in the preceding paragraphs will now be described with reference to FIG. 2.

The system 10 includes a premises security control device 16 that includes hardware 28 enabling the premises security control device 16 to communicate with one or more entities in system 10 and to perform one or more functions described herein. The hardware 28 may include a communication interface 30 for setting up and maintaining wired connection and/or wireless connection to one or more entities in system 10 such as remote monitoring center 20, premises device 14, user interface device 12, etc. In one or more embodiments, the premises security control device 16 hardware 28 further includes a display 22 such as LCD 22 for displaying information related to premises security control device 16 and/or premises security system 11. In one or more embodiments, the premises security control device 16 includes fingerprint sensor 24 such as, for example, an ultrasound-based fingerprint sensor 24 may include a transmitter for emitting ultrasonic waves and a receiver for receiving reflected ultrasonic waves for generating a 3D image of a user's fingerprint.

In the embodiment shown, the hardware 28 of the premises security control device 16 further includes processing circuitry 34. The processing circuitry 34 may include a processor 36 and a memory 38. In particular, in addition to or instead of a processor, such as a central processing unit, and memory, the processing circuitry 34 may comprise integrated circuitry for processing and/or control, e.g., one or more processors and/or processor cores and/or field programmable gate arrays (FPGAs) and/or application specific integrated circuits (ASICs) adapted to execute software and/or firmware based, e.g., embedded firmware instructions. The processor 36 may be configured to access (e.g., write to and/or read from) the memory 38, which may comprise any kind of volatile and/or nonvolatile memory, e.g., cache and/or buffer memory, random access memory (RAM), read-only memory (ROM), optical memory, and/or erasable programmable read-only memory (EPROM).

Thus, the premises security control device 16 further has software 40 stored internally in, for example, memory 38, or stored in external memory (e.g., database, storage array, network storage device, etc.) accessible by the premises security control device 16 via an external connection. The software 40 may be executable by the processing circuitry 34. The processing circuitry 34 may be configured to control any of the methods and/or processes described herein and/or to cause such methods, and/or processes to be performed, e.g., by premises security control device 16. Processor 36 corresponds to one or more processors 36 for performing premises security control device 16 functions described herein. The memory 38 is configured to store data, programmatic software code and/or other information described herein. In some embodiments, the software 40 may include instructions that, when executed by the processor 36 and/or processing circuitry 34, causes the processor 36 and/or processing circuitry 34 to perform the processes described herein with respect to premises security control device 16. For example, processing circuitry 34 of the premises security control device 16 may include authentication unit 42 which is configured to perform one or more premises security control device 16 functions described herein such as, for example, with respect to fingerprint determinations, authentication and/or other actions. For example, authentication unit 42 is configured to receive a scan of the user's fingerprint from the fingerprint sensor 24, determine whether the user's fingerprint meets an authentication criterion, and trigger a premises security system action based on the user's fingerprint meeting the authentication criterion.

The system 10 includes a user interface device 12 that includes hardware 44 enabling the user interface device 12 to communicate with one or more entities in system 10 and to perform one or more functions described herein. The hardware 44 may include a communication interface 46 for setting up and maintaining a wired connection and/or wireless connection to one or more entities in system 10 such as premises security control device 16, remote monitoring center 20, premises device 14, etc. The user interface device 12 hardware 44 further includes a display 22 such as LCD 22 for displaying information related to user interface device 12, premises security control device 16 and/or premises security system 11. The user interface device 12 includes fingerprint sensor 24 such as, for example, an ultrasound-based fingerprint sensor 24 may include a transmitter for emitting ultrasonic waves and a receiver for receiving reflected ultrasonic waves for generating a 3D image of a user's fingerprint.

In the embodiment shown, the hardware 44 of the user interface device 12 further includes processing circuitry 48. The processing circuitry 48 may include a processor 50 and a memory 52. In particular, in addition to or instead of a processor, such as a central processing unit, and memory, the processing circuitry 48 may comprise integrated circuitry for processing and/or control, e.g., one or more processors and/or processor cores and/or field programmable gate arrays (FPGAs) and/or application specific integrated Circuits (ASICs) adapted to execute software and/or firmware based, e.g., embedded firmware instructions. The processor 50 may be configured to access (e.g., write to and/or read from) the memory 52, which may comprise any kind of volatile and/or nonvolatile memory, e.g., cache and/or buffer memory and/or random access memory (RAM) and/or read-only memory (ROM) and/or optical memory, and/or erasable programmable read-only memory (EPROM).

Thus, the user interface device 12 further has software 53 stored internally in, for example, memory 52, or stored in external memory (e.g., database, storage array, network storage device, etc.) accessible by the user interface device 12 via an external connection. The software 53 may be executable by the processing circuitry 48. The processing circuitry 48 may be configured to control any of the methods and/or processes described herein and/or to cause such methods, and/or processes to be performed, e.g., by user interface device 12. Processor 50 corresponds to one or more processors 50 for performing user interface device 12 functions described herein. The memory 52 is configured to store data, programmatic software code and/or other information described herein. In some embodiments, the software 53 may include instructions that, when executed by the processor 50 and/or processing circuitry 48, causes the processor 50 and/or processing circuitry 48 to perform the processes described herein with respect to user interface device 12. For example, processing circuitry 48 of the user interface device 12 may include authentication unit 42, as described above with respect to premises security control device 16, but where, in this embodiment, is configured to perform one or more user interface device 12 functions described herein such as, for example, with respect to fingerprint determinations, authentication and/or other actions. For example, authentication unit 42 is configured to receive a scan of the user's fingerprint from the fingerprint sensor 24, determine whether the user's fingerprint meets an authentication criterion, and inform the premises security control device 16 whether the user's fingerprint meets the authentication criterion. In another example, authentication unit 42 at user interface device 12 may be configured to receive a scan of the user's fingerprint from the fingerprint sensor 24 and forward the scan to premises security control device 16 for further processing and analysis.

Figure 2:
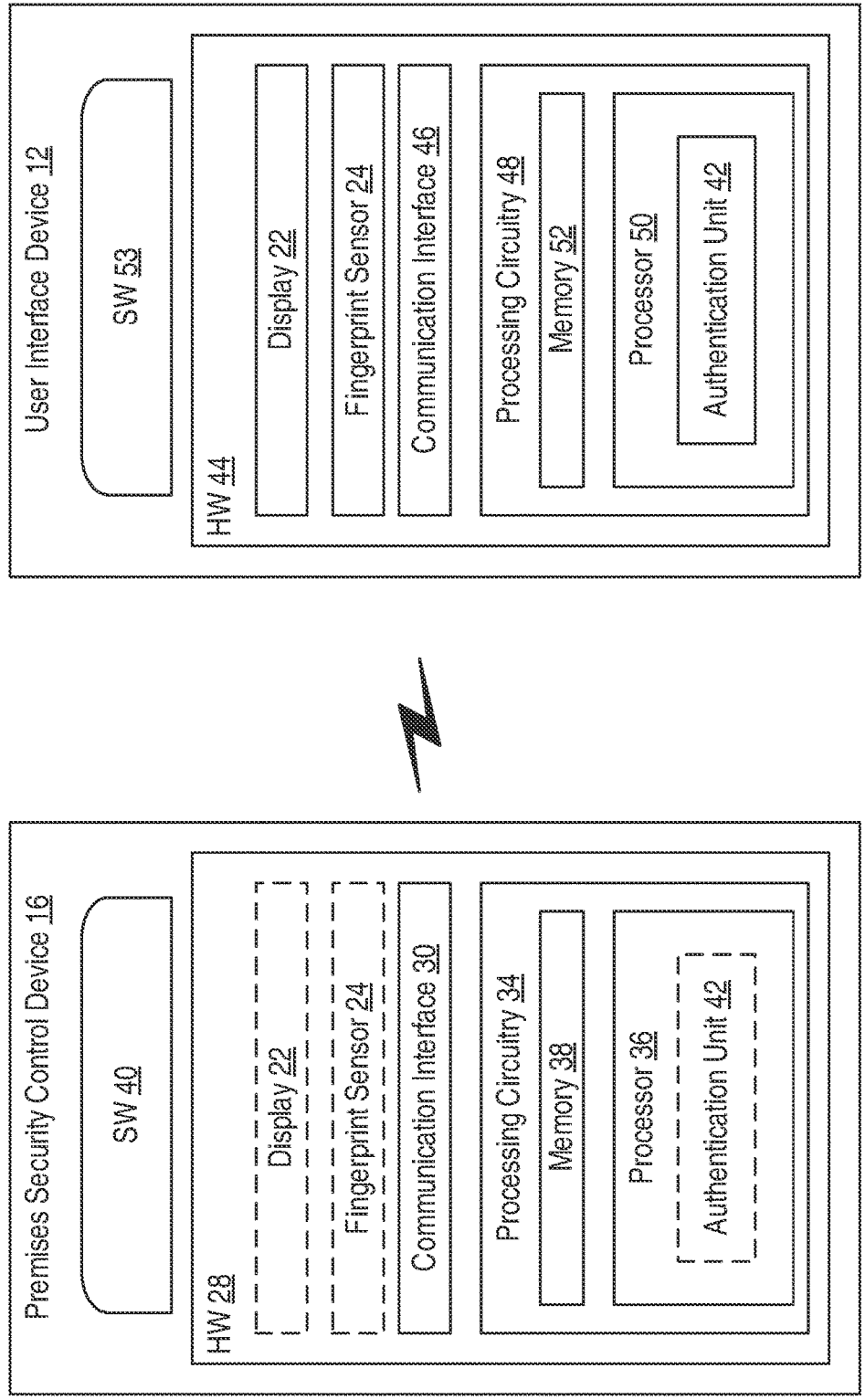
FIG. 2 is a block diagram of an example of some devices in the system in accordance with various embodiments of the present disclosure.

Although FIGS. 1 and 2 show authentication unit 42 as being within a respective processor, it is contemplated that this unit may be implemented such that a portion of the unit is stored in a corresponding memory within the processing circuitry. In other words, the unit may be implemented in hardware or in a combination of hardware and software within the processing circuitry. Further, while user interface device 12 and premises security control device 16 are described as including an authentication unit 42 for performing, for example, fingerprint-based functionality, one or more of these functions such as the authentication criterion comparison may alternatively be performed by a remote server in network 18, remote monitoring center 20, cloud network and/or by another device in communication with premises security system 11 via network 18.

Figure 3:
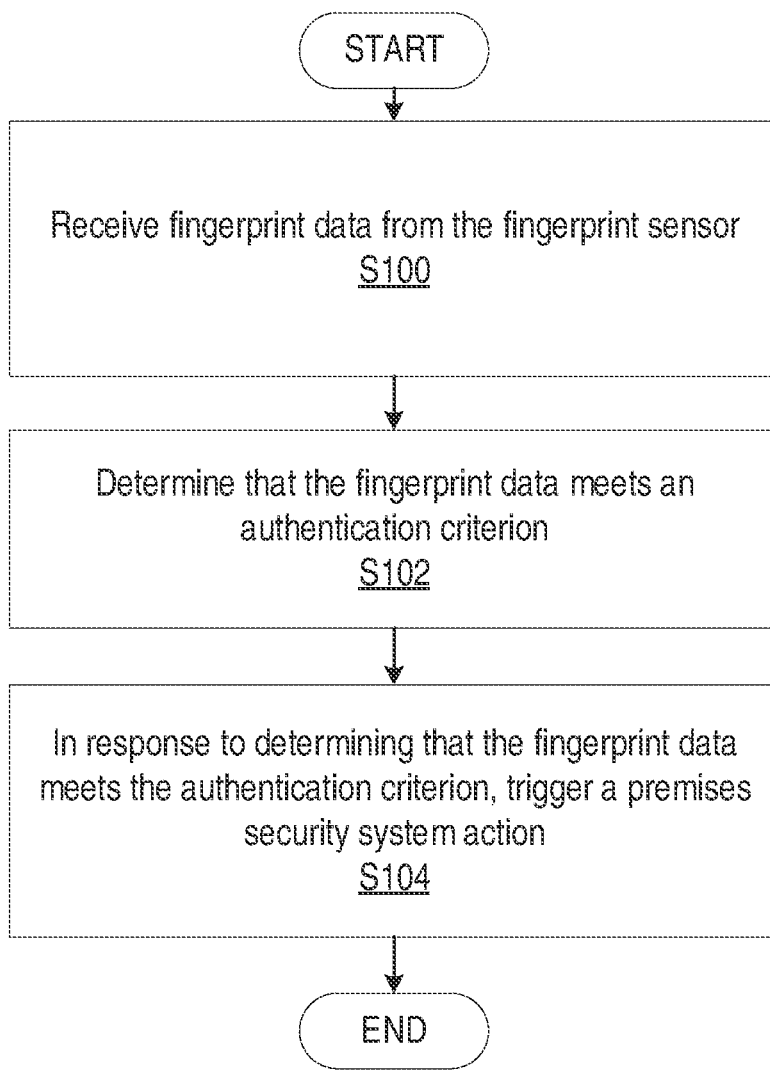
FIG. 3 is a flow chart of an example process in accordance with various embodiments of the present disclosure.

FIG. 3 is a flowchart of an example process in a user interface device 12 in premises security system 11 according to one or more embodiments of the present disclosure. One or more blocks described herein may be performed by one or more elements of user interface device 12 such as by one or more fingerprint sensors 24, processing circuitry 48 (including authentication unit 42), processor 50, etc. The user interface device includes a plastic housing, LCD 22 removably secured to the plastic housing, and a fingerprint sensor 24 mounted in a fixed position relative to the plastic housing and the LCD. User interface device 12 is configured to receive (Block S100) fingerprint data from the fingerprint sensor 24, as described herein. User interface device 12 is configured to determine (Block S102) that the fingerprint data meets an authentication criterion, as described herein. User interface device 12 is configured to, in response to determining that the fingerprint data meets the authentication criterion, trigger (Block S104) a premises security system action, as described herein.

According to one or more embodiments, the fingerprint sensor 24 is embedded in the LCD 22.

According to one or more embodiments, the fingerprint sensor 24 is positioned within and against the plastic housing.

According to one or more embodiments, the fingerprint sensor 24 is configured to use ultrasonic waves to create a three-dimensional image representing a plurality of fingerprint characteristics, and the processing circuitry 48 is further configured to determine that the three-dimensional image meets the authentication criterion. For example, fingerprint characteristics includes include fingerprint patterns such as one or more of arches, loops and whorls along with shape, size, number and arrangement of details which makes each fingerprint unique. Further, in one or more embodiments, the fingerprint characteristics of a user's scanned finger can be mapped to a 3D template fingerprint such as to measure the peak and valley of finger ridges to create a 3-dimensional depth map as well as map the curvature of the fingertip as it relates to the ridges, blood vessels and other characteristics unique to users, such as by using ultrasonic sound wave and/or infrared light refraction to create 3D template.

According to one or more embodiments, the data associated with the fingerprint scan comprises at least one of a blood flow or an impedance associated with the fingerprint scan.

According to one or more embodiments, the processing circuitry 48 is further configured to determine whether the scan of the user's fingerprint is associated with a user management profile, and the determination of whether the user's fingerprint meets the authentication criterion is based on the user management profile being determined to be associated with the scan of the user's fingerprint.

According to one or more embodiments, the plastic housing, the LCD 22, the fingerprint sensor 24, and processing circuitry 48 forms at least a portion of a control panel for the premises security system 11.

According to one or more embodiments, the processing circuitry 48 is further configured to: detect a button press on the LCD 22, during the button press, detect the fingerprint, match the scan of the user's fingerprint that was captured during the button press with a stored fingerprint, and determine that the data associated with the fingerprint scan meets the authentication criterion based on the match.

According to one or more embodiments, the processing circuitry 48 is further configured to use an output of the fingerprint sensor to provide a finger swipe user interface on the LCD 22. That is, in various embodiments, a finger swipe over the fingerprint sensor 24 in a particular direction may be linked to a specific user interface (UI) function, thereby supporting alternative forms of navigation. For example, the fingerprint sensor 24 and/or authentication unit 42 are configured to determine a direction of the finger swipe across the fingerprint sensor 24 where one or more directions may be predefined in memory 38 and memory 52 as corresponding to a particular UI function. In one or more embodiments, the initial touch to the fingerprint sensor 24 is logged as starting point for the swipe detection direction. From that point, +/−X/Y coordinate movement determined by user interface device 12 will determine the direction of the swipe (e.g., up/down or left/right).

According to one or more embodiments, the display 22 comprises a liquid crystal display 22 (LCD 22), and the fingerprint sensor 24 is embedded between a glass layer of the LCD 22 and a reflective back surface of the LCD 22.

In one or more embodiments, the fingerprint sensor 24 is embedded between a glass layer of the LCD 22 and a reflective back surface of the LCD 22 (e.g., LCD panel 54). In some embodiments, the fingerprint sensor 24 may use the biometrics of a user's finger to enable arming and disarming of the premises security system 11.

Hence, the use of an embedded ultrasonic fingerprint sensor 24 as described herein advantageously enhances the user experience as the user no longer has to remember a code to arm or disarm their premises security system 11 or carry any arm or disarm peripherals, such as a key fob or RFID tag, which are susceptible to being lost or stolen. Further, incorporating a fingerprint sensor 24 into a premises security system 11 may help reduce or eliminate false alarms due to user errors, eliminate the need for keypads and user codes, improve the management of users as a fingerprint is unique to a particular person, facilitate user input methods and more secure credentials, and provide higher reliability and greater flexibility for designing hardware and software applications. Alternatively, the fingerprint sensor 24 may be used in two-factor authentication (2FA) techniques along with an input PIN.

Figure 4:
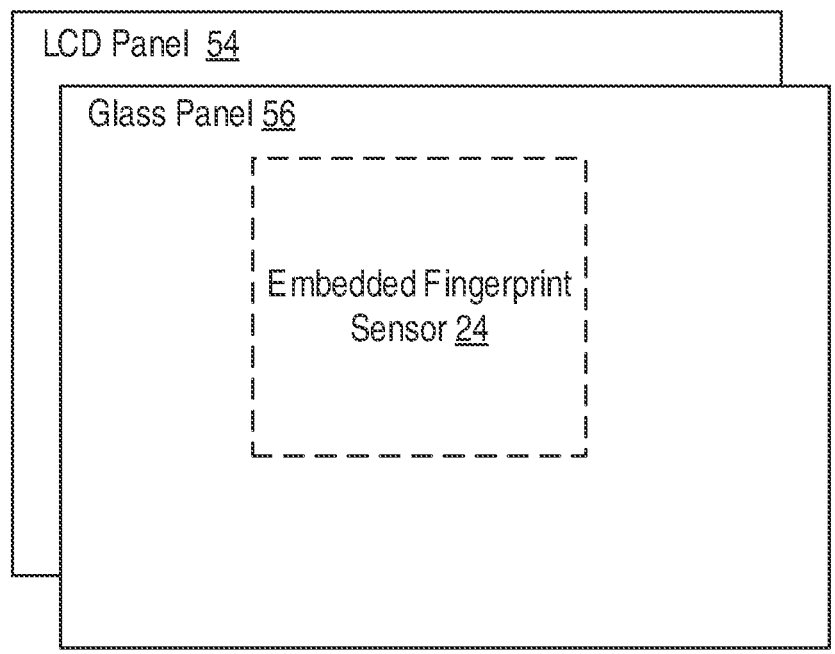
FIG. 4 is a block diagram of an example fingerprint sensor embedded in a display in accordance with various embodiments of the present disclosure.

Referring now to FIG. 4, in some embodiments, the display 22 is an LCD 22 that comprises an LCD panel 54 covered by a glass panel 56. In such embodiments, the fingerprint sensor 24 may be embedded in LCD 22 so that it is positioned under the glass panel 56, or positioned between the glass panel 56 and LCD panel 54 (e.g., sandwiched between glass panel 56 and LCD panel 54). The LCD panel 54 and glass panel 56 may be part of an LCD 22 for a premises security system 11 that allows for the displaying of information related to premises security system 11.

In one or more embodiments, the fingerprint sensor 24 may alternatively be positioned under or within the plastic housing of user interface device 12 (or premises security control device 16) such as against an inner wall of the plastic housing of user interface device 12. In this example, one or more illuminating elements (e.g., LEDs) may be configured to illuminate a position location proximate to the fingerprint sensor 24 for a user to place a finger for fingerprint scanning. That is, the illuminating elements may illuminate an area of the fingerprint sensor 24.

Hence, one or more embodiments described herein allow the user's fingerprint to be scanned through the glass or plastic material using ultrasonic waves to map a three-dimensional (3D) image of a person's unique fingerprint characteristics, such as sweat pores, ridges and other details as well as detect blood flow and impedance to avoid spoofing. User-managed profiles of such features may be created based on credentials and stored at user interface device 12 and/or premises security control device 16.

As will be appreciated by one of skill in the art, the concepts described herein may be embodied as methods, data processing systems, computer program products and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A system, comprising:
   a premises sensor configured to detect a premises condition associated with a premises;
   a premises security control device configured to obtain data from the premises sensor representing the premises condition, the premises security control device being further configured to communicate with a remote monitoring center; and a user interface device configured to communicate with the premises security control device, the user interface device comprising:
a plastic housing;
a liquid crystal display (LCD) removably secured to the plastic housing, the LCD being configured to display information related to monitoring of the premises;
a fingerprint sensor embedded in the LCD; and
processing circuitry configured to:
receive fingerprint data from the fingerprint sensor;
determine that the fingerprint data meets an authentication criterion; and
in response to determining that the fingerprint data meets the authentication criterion, trigger a premises security system action.

2. The system of claim 1, wherein the fingerprint sensor is configured to use ultrasonic waves to create a three-dimensional image representing a plurality of fingerprint characteristics; and
the processing circuitry is further configured to determine that the three-dimensional image meets the authentication criterion.

3. The system of claim 1, wherein the data associated with the fingerprint scan comprises at least one of a blood flow or an impedance associated with the fingerprint scan.

4. The system of claim 1, wherein the processing circuitry is further configured to determine whether the scan of the user's fingerprint is associated with a user management profile; and
the determination of whether the user's fingerprint meets the authentication criterion is based on the user management profile being determined to be associated with the scan of the user's fingerprint.

5. The system of claim 1, wherein the plastic housing, the LCD, the fingerprint sensor, and processing circuitry form at least a portion of a control panel for the premises security system.

6. The system of claim 1, wherein the processing circuitry is further configured to:
detect a button press on the LCD;
during the button press, detect the fingerprint using the fingerprint sensor embedded in the LCD;
match the scan of the user's fingerprint that was captured during the button press with a stored fingerprint; and
determine that the data associated with the fingerprint scan meets the authentication criterion based on the match.

7. The system of claim 1, wherein the processing circuitry is further configured to use an output of the fingerprint sensor to provide a finger swipe user interface on the LCD.

8. The system of claim 1, wherein the fingerprint sensor is embedded between a glass layer of the LCD and a reflective back surface of the LCD.

9. A method implemented by a user interface device comprising a plastic housing, a liquid crystal display (LCD) removably secured to the plastic housing and a fingerprint sensor embedded in the LCD, the LCD is configured to display information related to monitoring of a premises and communicate with a premises security control device, the premises security control device configured to obtain data from a premises sensor representing a premises condition associated with the premises and communicate with a remote monitoring center, the premises sensor configured to detect the premises condition, the method comprising:
receiving fingerprint data from the fingerprint sensor;
determining that the fingerprint data meets an authentication criterion; and
in response to determining that the fingerprint data meets the authentication criterion, triggering a premises security system action.

10. The method of claim 9, wherein the fingerprint sensor is configured to use ultrasonic waves to create a three-dimensional image representing a plurality of fingerprint characteristics; and
the method further comprising determining that the three-dimensional image meets the authentication criterion.

11. The method of claim 9, wherein the data associated with the fingerprint scan comprises at least one of a blood flow or an impedance associated with the fingerprint scan.

12. The method of claim 9, further comprising determining whether the scan of the user's fingerprint is associated with a user management profile; and
the determination of whether the user's fingerprint meets the authentication criterion is based on the user management profile being determined to be associated with the scan of the user's fingerprint.

13. The method of claim 9, wherein the plastic housing, the LCD and the fingerprint sensor form at least a portion of a control panel for the premises security system.

14. The method of claim 9, further comprising:
detecting a button press on the LCD;
during the button press, detecting the fingerprint using the fingerprint sensor embedded in the LCD;
matching the scan of the user's fingerprint that was captured during the button press with a stored fingerprint; and
determining that the data associated with the fingerprint scan meets the authentication criterion based on the match.

15. The method of claim 9, further comprising using an output of the fingerprint sensor to provide a finger swipe user interface on the LCD.

16. The method of claim 9, wherein the fingerprint sensor is embedded between a glass layer of the LCD and a reflective back surface of the LCD.

* * * * *